United States Patent [19]

Lipton et al.

[11] Patent Number: 5,463,428
[45] Date of Patent: Oct. 31, 1995

[54] WIRELESS ACTIVE EYEWEAR FOR STEREOSCOPIC APPLICATIONS

[75] Inventors: Lenny Lipton, San Rafael; Jeffrey J. Halnon, Richmond; Larry H. Mitchell, Cupertino; Robert Hursey, Carmel Valley, all of Calif.

[73] Assignee: StereoGraphics Corporation, San Rafael, Calif.

[21] Appl. No.: 193,279

[22] Filed: Feb. 8, 1994

[51] Int. Cl.⁶ .................................................. G02C 1/00
[52] U.S. Cl. ................................ 351/158; 351/41; 359/36
[58] Field of Search ........................... 351/41, 45, 158; 359/36, 85, 88, 257

[56] References Cited

U.S. PATENT DOCUMENTS

| | | | |
|---|---|---|---|
| 3,227,836 | 1/1966 | Renwick, Sr. | 351/158 |
| 4,884,876 | 12/1989 | Lipton et al. | 350/347 E |
| 4,967,268 | 10/1990 | Lipton et al. | 358/92 |
| 5,117,302 | 5/1992 | Lipton | 359/227 |
| 5,181,133 | 1/1993 | Lipton | 359/84 |

Primary Examiner—William L. Sikes
Assistant Examiner—Huy Mai
Attorney, Agent, or Firm—Limbach & Limbach

[57] ABSTRACT

Wireless active eyewear includes a frame having a front portion and a rear portion. A gasket and shutter assembly and a circuit board are held between the front and rear portions of the frame. The non-conductive gasket has electro-optical shutters integrally formed therewith and includes conductive plugs extending therefrom which electrically contact each of the electro-optical shutters and the circuit board. The frame includes temple arms hingedly attached thereto and an on/off switch which is actuated by opening and closing the temple arms.

13 Claims, 7 Drawing Sheets

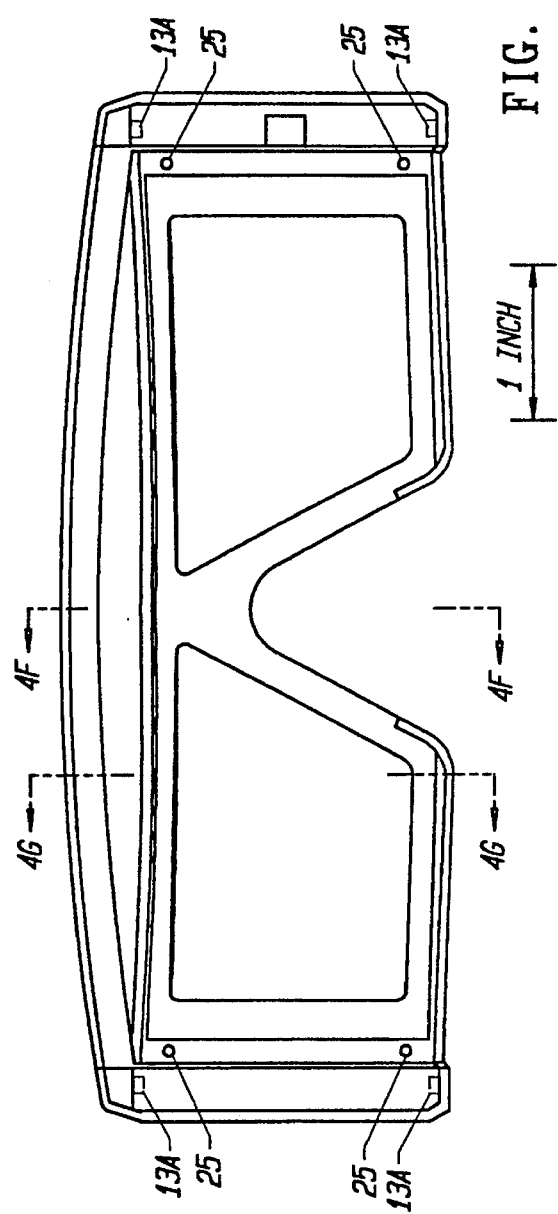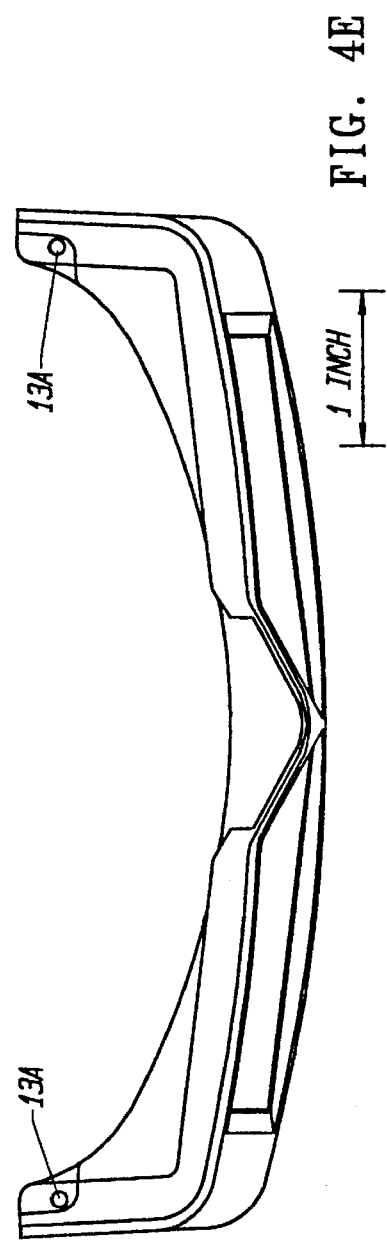

WIRELESS ACTIVE EYEWEAR FOR STEREOSCOPIC APPLICATIONS

BACKGROUND OF THE INVENTION

The present invention relates to wireless active eyewear for use in viewing field sequential stereoscopic images. Stereoscopic eyewear of this type has been discussed in the following U.S. patents by Lipton et al.: U.S. Pat. No. 4,884,876 (1989) entitled "ACHROMATIC LIQUID CRYSTAL SHUTTER FOR STEREOSCOPIC AND OTHER APPLICATIONS;" U.S. Pat. No. 4,967,268 (1990) entitled "LIQUID CRYSTAL SHUTTER SYSTEM FOR STEREOSCOPIC AND OTHER APPLICATIONS;" U.S. Pat. No. 5,117,302 (1992) entitled "HIGH DYNAMIC RANGE ELECTRO-OPTICAL SHUTTER FOR STEREOSCOPIC AND OTHER APPLICATION;" and U.S. Pat. No. 5,181,133 (1993) entitled "DRIVE METHOD FOR TWISTED NEMATIC LIQUID CRYSTAL SHUTTERS FOR STEREOSCOPIC AND OTHER APPLICATIONS."

Products following the art taught in these above mentioned patents have been manufactured and offered for sale by StereoGraphics Corporation under the CrystalEyes® trademark. Similar products have been offered in the marketplace by IMAX, Tektronix, and others.

Such products have certain basic features in common, in particular, liquid crystal (LC) shutters are driven electrically by on-board circuits and batteries, and synchronization information with regard to the field rate of the video source is received by an infrared (IR) sensor. This synchronization information is used to electrically drive the LC shutters out of phase with each other and in sequence with the video fields. (The term video is used in the generic sense of electronic images which are raster scanned.)

StereoGraphics' experience with manufacturing and marketing the CrystalEyes® product has resulted in a continuous examination of the product design. We believe that improvement is possible in terms of instrumentation and cost of manufacture of such products, and this disclosure will describe several concerns and how they have been addressed.

One concern was the need for turning the eyewear on and off. Presently, an on-off button is used, but people are not used to operating a button when wearing eyewear. It would be desirable if the CrystalEyes product was more like ordinary eyewear in this regard in order to heighten user acceptance and enjoyment of the product, i.e., if it did not need an on/off button. Moreover, if one forgets to turn off the eyewear, battery drain and reduction of battery life result without any user benefit.

The present CrystalEyes product has a circuit that turns off the eyewear after an interval of several minutes, but only if is not left facing the monitor/emitter. The continuous detection of an emitted IR sync signal enables the eyewear such that it will not turn off.

Another area of concern is the fact that the LC shutters are made of thin glass and may be broken on occasion, usually because the eyewear has fallen onto a hard surface. Tektronix and IMAX have both addressed this problem by surrounding the LC shutters with a shock absorbing rubber gasket.

Still another area of concern is the electrical connection between the LC shutters and the circuit board. Both elastomeric connectors and soldered wires have been used. Both have their advantages and disadvantages. A method has been sought to obtain a good electrical contact and to reduce the cost of manufacture of this necessary assembly step.

Yet another area of concern is the nosepiece of the eyewear. For greatest comfort it was felt that a rubber or soft nosepiece should be used. However, the addition of such a nosepiece adds a manufacturing step, and the part itself has some cost.

SUMMARY OF THE INVENTION

The present invention is an improvement in wireless active eyewear of the type used for viewing field-sequential stereoscopic images. In the preferred embodiment, a front frame and a rear frame are made from injection molded plastic and designed to snap-fit together, holding therebetween a gasket and shutter assembly and a printed circuit board. Temple arms are hingedly attached to the front frame.

In one aspect of the invention, an on/off switch is mounted on the frame and is actuated by a post in one of the temple arms when the arm is opened. Closing the arm deactivates the switch.

In another aspect of the invention, the shutters are integrally mounted in a molded, flexible non-conductive gasket. The gasket also includes conductive plugs which are molded so as to be in contact with the shutters and with the circuit board.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 4D is a rear plan view of the eyewear shown in FIG. 4B.

FIG. 4E is a bottom plan view of the eyewear shown in FIG. 4B.

DESCRIPTION OF THE PREFERRED EMBODIMENT

Figure 1:
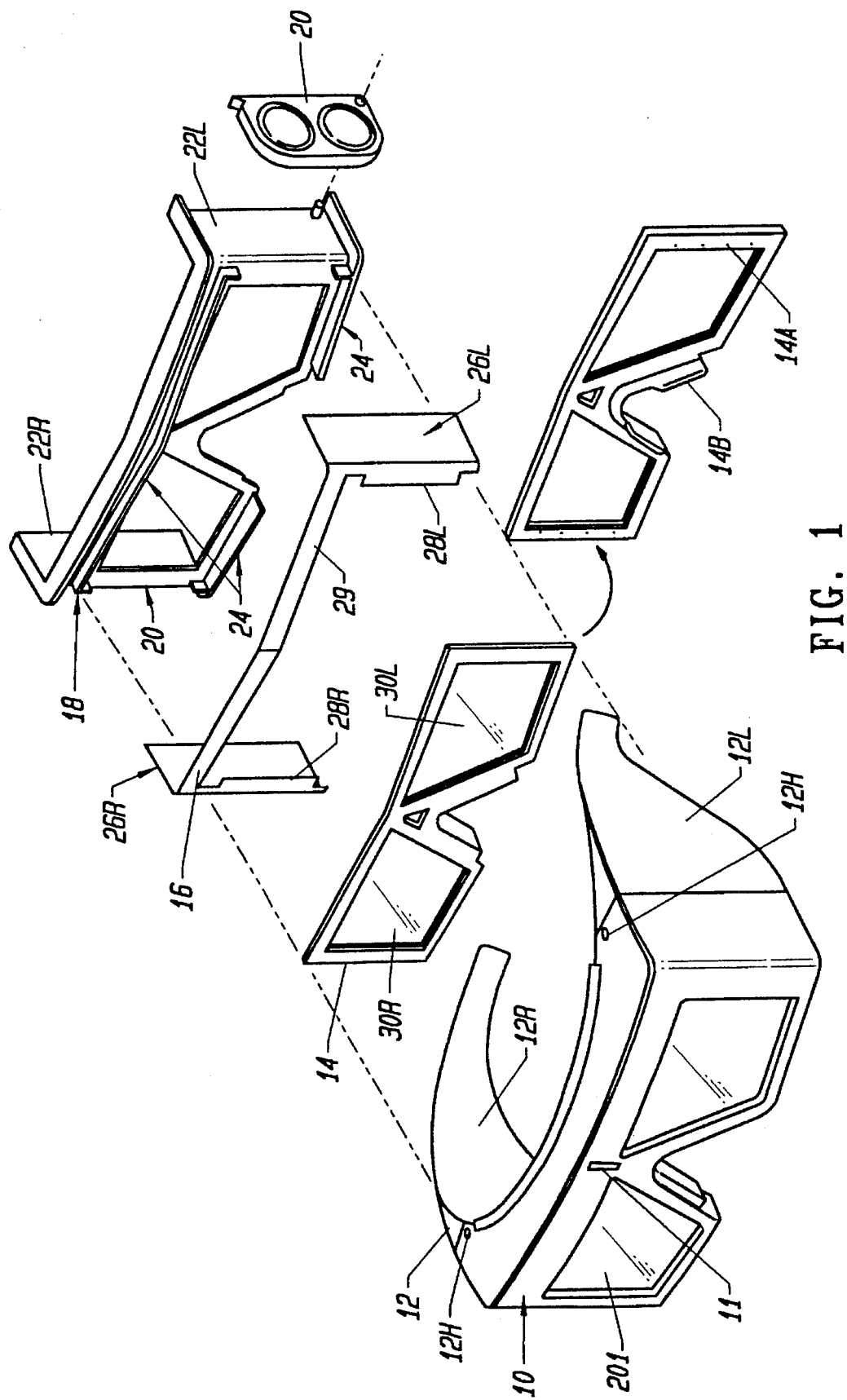
FIG. 1 shows an exploded perspective view of wireless active eyewear according to the present invention.

FIG. 1 illustrates an exploded view of a pair of wireless active eyewear in accordance with the present invention. A front frame 10 has a pair of temple arms 12L, 12R attached thereto via hinges 12h. The front frame 10 snaps onto the rear frame 18 and sandwiches lens gasket 14 and circuit board 16 therebetween. An infrared sensor (not shown) is attached to the circuit board 16 for receiving synchronization information through clear plastic window 11.

According to one aspect of the present invention, an on/off switching mechanism is incorporated into one side of the eyewear in order to be actuated by a folding temple mechanism. This feature is more clearly illustrated in FIGS. 2 and 3, and will be described in more detail below. Thus, when the temple arms 12 are opened for wearing the eyewear, the glasses turn on. When the temple arms 12 are closed, the glasses turn off.

The front frame 10, temple arms 12 and rear frame 18 are preferably molded plastic, the front frame and/or rear frame including suitable ribs and bossing to allow the components to be snapped together in a secure fashion without the need for additional fasteners, such as screws or the like.

The rear frame 18 is molded to have a face panel 20 and temple panels 22L and 22R. The face panel 20 is framed by various ribs 24 to receive and snugly position the circuit board 16 and other components therein.

The circuit board 16 includes temple pads 26L and 26R, LC pads 28L and 28R, and bridge 29. Battery power may be conveniently supplied to one of the temple pads 22L while the on/off switching mechanism is incorporated in the other temple pad 22R. The LC pads 28L, 28R provide electrical contact for the LC lenses 30L, 30R which are sealed in lens gasket 14 as described more fully below. The bridge 29 includes various circuit components (not shown) including an infrared sensor for receiving synchronization information from the video source.

Figure 2:
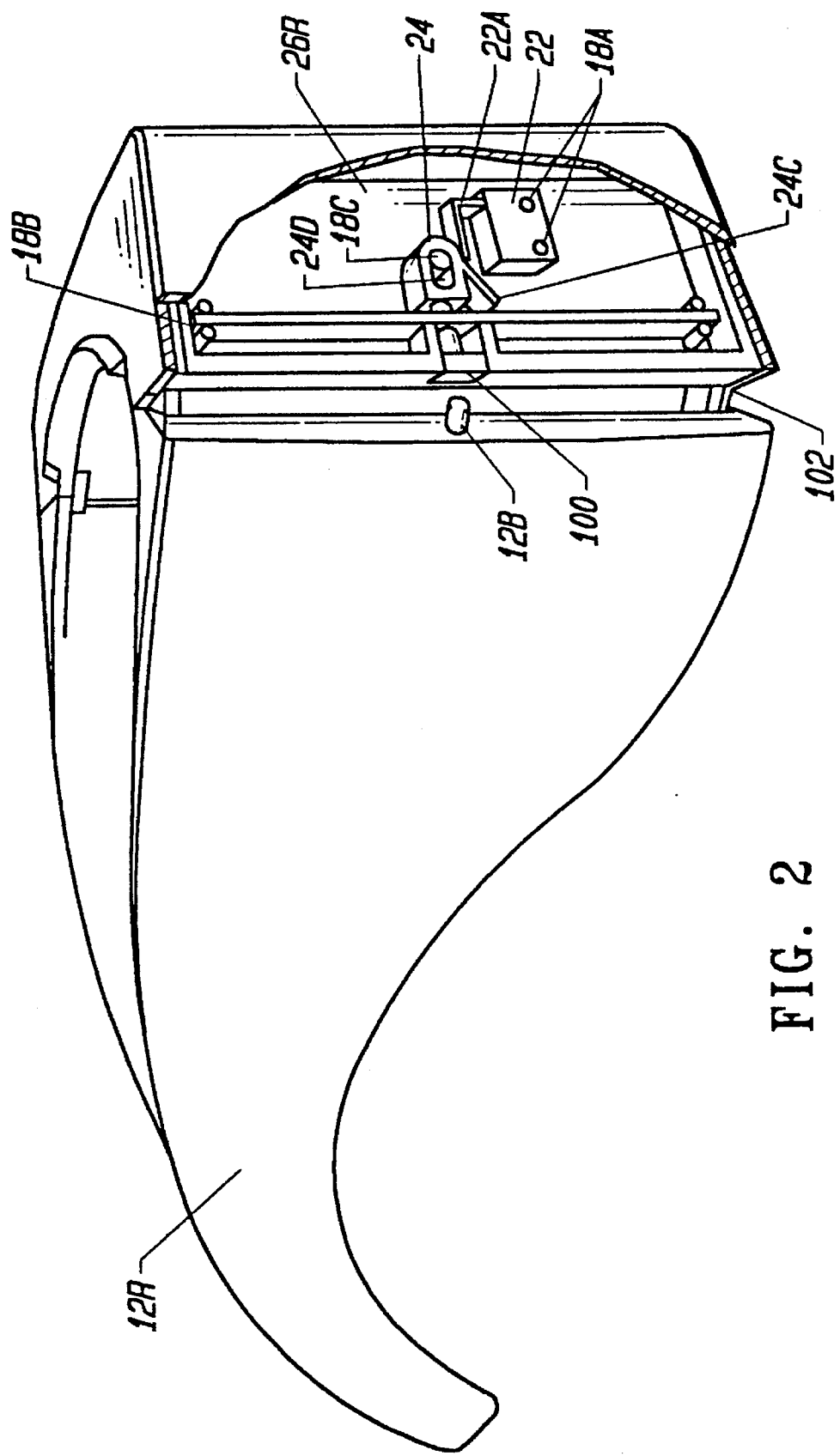
FIG. 2 shows a cutaway view of one side of the eyewear of FIG. 1 showing the on/off switching mechanism.
Figure 3B:
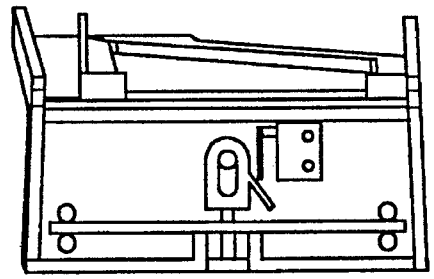
FIGS. 3A and 3B are side plan views of the eyewear showing the switching mechanism in the on position and the off position, respectively.
Figure 3A:
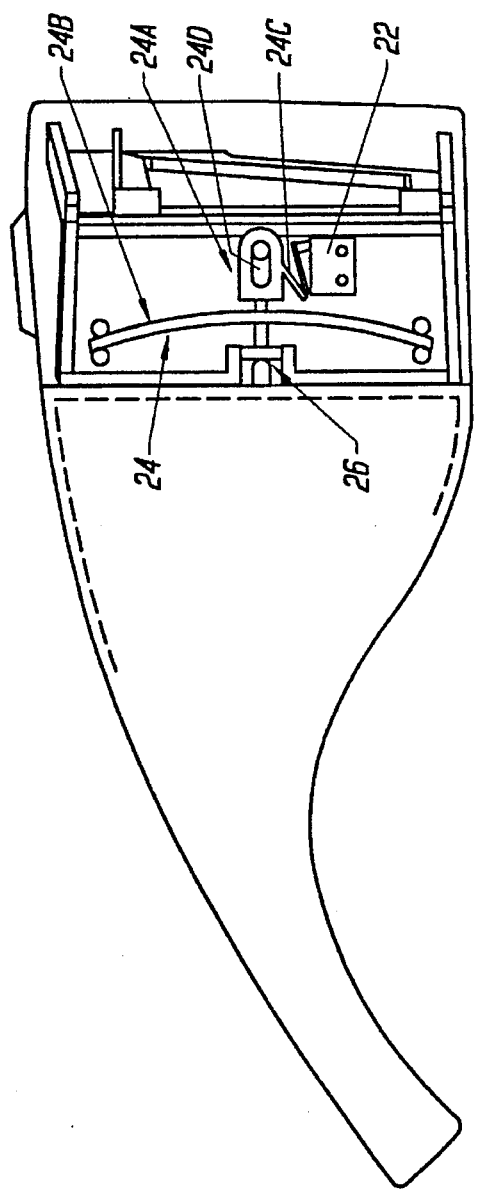
Figure 4A:
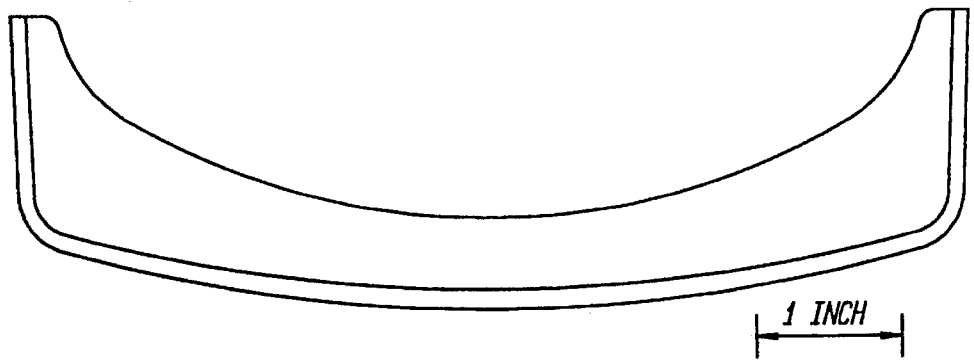
FIG. 4A is a top plan view of another embodiment of wireless active eyewear according to the present invention.
Figure 4B:
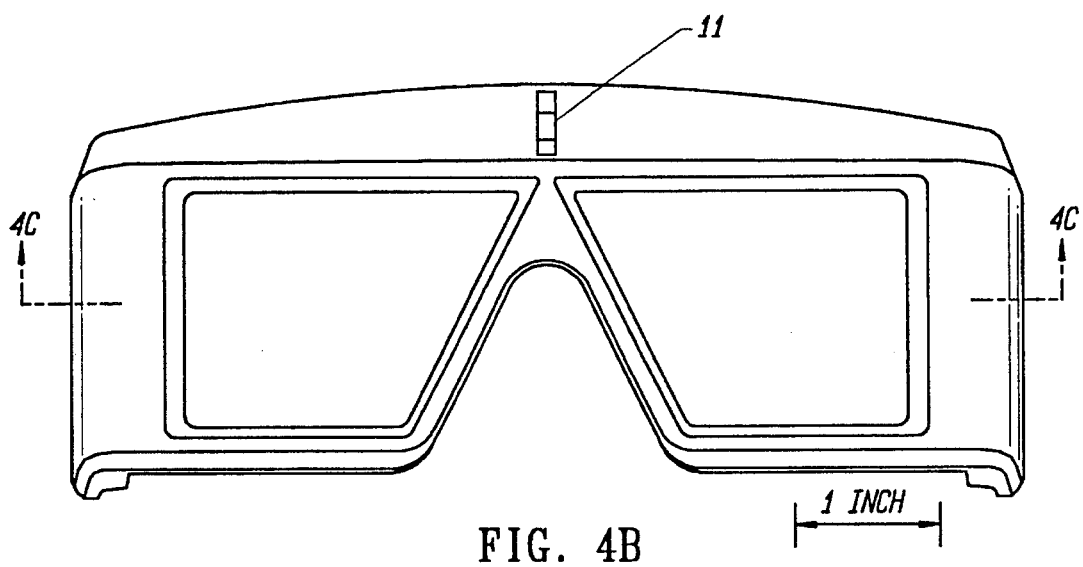
FIG. 4B is a front plan view of the eyewear shown in FIG. 4A.
Figure 4C:
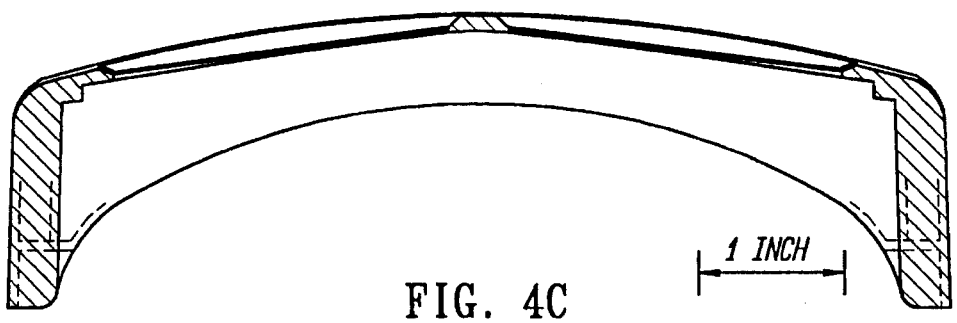
FIG. 4C is a sectional view of the eyewear taken across section 4C—4C of FIG. 4B.
Figure 4F:
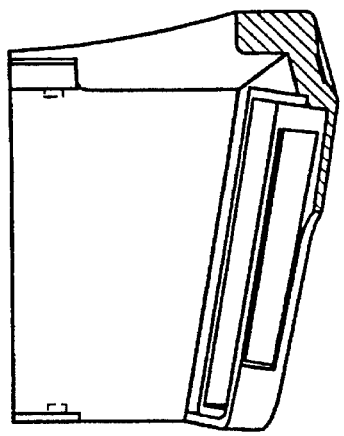
FIG. 4F is a sectional view of the eyewear taken across section 4F—4F of FIG. 4D.
Figure 4G:
FIG. 4G is a sectional view of the eyewear taken across section 4G—4G of FIG. 4D.

The on/off switching mechanism is illustrated more clearly in FIG. 2. The switching mechanism is comprised of a switch 22 and an actuator 24. The switch 22 is soldered to the temple pad 26R of circuit board 16 and is precisely located for mounting over a pair of posts 18a which are molded on the rear frame 18. The switch 22 includes an actuator arm 22a which is positioned to interact with the actuator 24.

The actuator 24 is a single piece of injection molded plastic having three functional portions, namely a plunger portion 24a, a spring portion 24b, and a ramp portion 24c. This may be clearly seen in FIGS. 3a and 3b, where the cross-hatching represents the one-piece actuator 24. The actuator is held in place in two ways: first, the spring portion 24b of the actuator 24 is held between four retainer posts 18b as shown; second, the plunger portion 24a is fitted into opening 10o in the front frame 10. The plunger portion 24a includes an elongated slot 24d which fits over guide post 18c.

When the temple arm 12 is opened (for wearing), the actuating post 12b on temple arm 12R pushes in the plunger portion 24a of the actuator 24, thereby causing the spring portion 24b to flex or bow inward and the ramp portion 24c to push on the actuator arm 22a to thereby activate the switch.

When the temple arm 12 is closed (for storing), the actuating post 12b releases the plunger portion 24a and the spring force of the spring portion 24b will bias the plunger to its normal rest position, thereby disengaging the switch 22. In one embodiment, the spring force will be sufficient to exert a force on post 12b which will bias the temple arm to a slightly closed position. The material and thickness of the switch components should be carefully selected to provide an adequate reaction force, but not so much movement that the part will be susceptible to fatigue failure.

The switch 22 should be capable of switching 6 volts at 1 milliamp. This specification requires clean switching contact, therefore gold contact surfaces should be used. Acceptable results have been achieved using a Cherry DH1C (0.1 inch width) or an Omron D2MQ switch (0.1 inch width).

The plunger 24 is used to accommodate the requirements of the switch 22. A switch which is small enough to fit within the eyewear necessarily has a narrow mechanical operating range. The plunger should be configured so that the switch is reliably operated over a wide variety of circumstances. For example, the glasses must continue to operate reliably even when being worn by a user who has a particularly small head. Further, a comfortable wearing configuration might not open the temple arm 12 all the way, but the eyewear and its on/off switching mechanism must still function reliably.

This configuration of actuator 24 is advantageous because the reaction forces are provided by the flex of the actuator itself, not by the spring within the switch 22. Another advantage is that the actuator force is reliably and repeatably defined and limited by the shape of the ramp portion 24c. The limited overtravel of the switch can easily be accommodated.

The lens gasket 14 is unique in that it provides three valuable functions in one molded silicon rubber part. It provides a protective mount for the LC lenses for protecting against breakage when the eyewear is dropped or subject to some other form of stress. The gasket 14 includes conductive rubber plugs 14a (four per lens) for providing an electrical connection between the LC contact ledges and the circuit board 16. The lens gasket 14 also includes a soft nosepiece 14b that makes the glasses comfortable to wear without requiring an additional part to pad the nose.

A pair of LC lenses 30L and 30R are mounted inside gasket 14. The gasket 14 surrounds the edges of the lenses and traps them in place. The gasket overlaps a small portion of the flat surfaces of the lenses. However, no usable viewing area is lost, as each lens area includes a small seal area. The gasket does not extend beyond the lens seal. The glass of each lens is thus suspended within the gasket.

Front frame 10 snaps into place on rear frame 18, thus sandwiching the lens and gasket assembly therebetween. Small pressure pads may be molded into the front and rear frames to poke into the gasket 14 in strategic locations around each lens. Thus, the gasket 14 will be held in place but allowed to move a little. This freedom for movement provides protection from impact shock.

A method for making the electrical connection between the lenses 30L and 30R and the circuit board 16 is also provided for. Conductive rubber rods 14a are molded as part of the gasket 14 and provide contact with the conductive surfaces on the ledges of the LC lenses 30L and 30R as well as with the LC pads 28L and 28R. Therefore, no elastomeric connectors, soldered wires, or slide on pins are needed. Thus, shock mounting and electric connection is achieved in one step.

The conductive rods 14a may be preformed and inserted into the gasket as the gasket is formed, or they can be inserted after the completed gasket has been formed. It is also possible to manufacture a gasket with conductivity in some selected areas by composing it of two different formulations at the same time. Most areas of the gasket would be made of non-conductive material and typically four spots for each lens could be made of conductive material.

The conductive rods could be replaced with a different type of contact, such as a spring, metal clip, or replaced with a conductive film, foil, wrap, or paint, or the like.

The nosepiece could have been included as an element of the front frame 10 or rear frame 18. However, it is preferred for reasons of both cost and product integrity to eliminate secondary operations and attachments. Thus, a molded nosepiece 14b has been included as part of the molded gasket 14. The nosepiece 14b is soft and flexible, thereby providing maximum comfort for the wearer.

By going beyond simple shock absorption, the present invention provides substantial benefits. A single part, the gasket, performs three functions: it serves as a shock absorber to protect the glass LC shutters; it provides electrical conductivity from the circuit board to the shutter electrodes to power the shutters; and finally, the gasket also serves as a nosepiece. This design substantially reduces cost of manufacture by reducing the number of parts needed and it also reduces the labor costs involved in assembly.

Figure 5A:
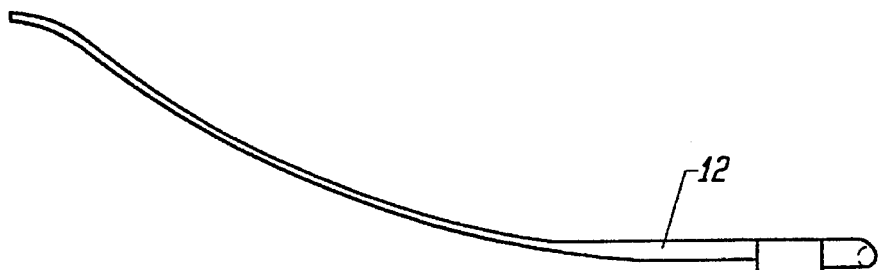
FIG. 5A is a top plan view of a typical temple arm of the preferred embodiment of wireless active eyewear according to the present invention.
Figure 5B:
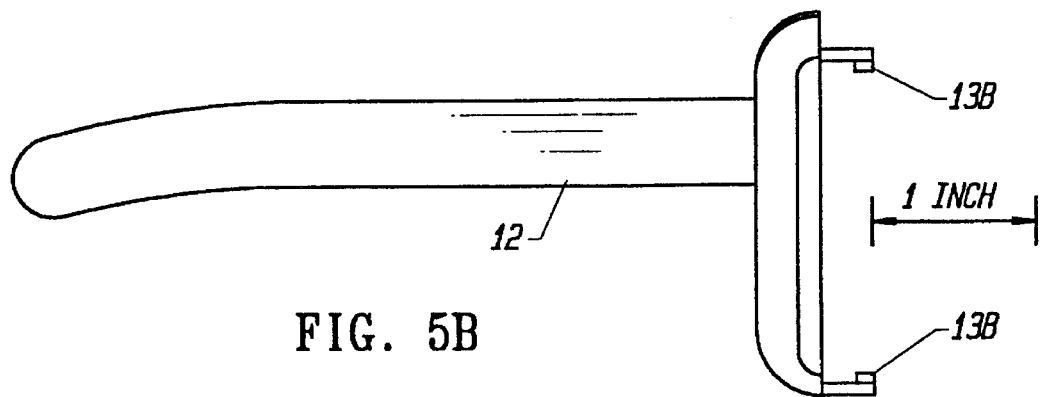
FIG. 5B is a side plan view of the temple arm of FIG. 5A.
Figure 6:
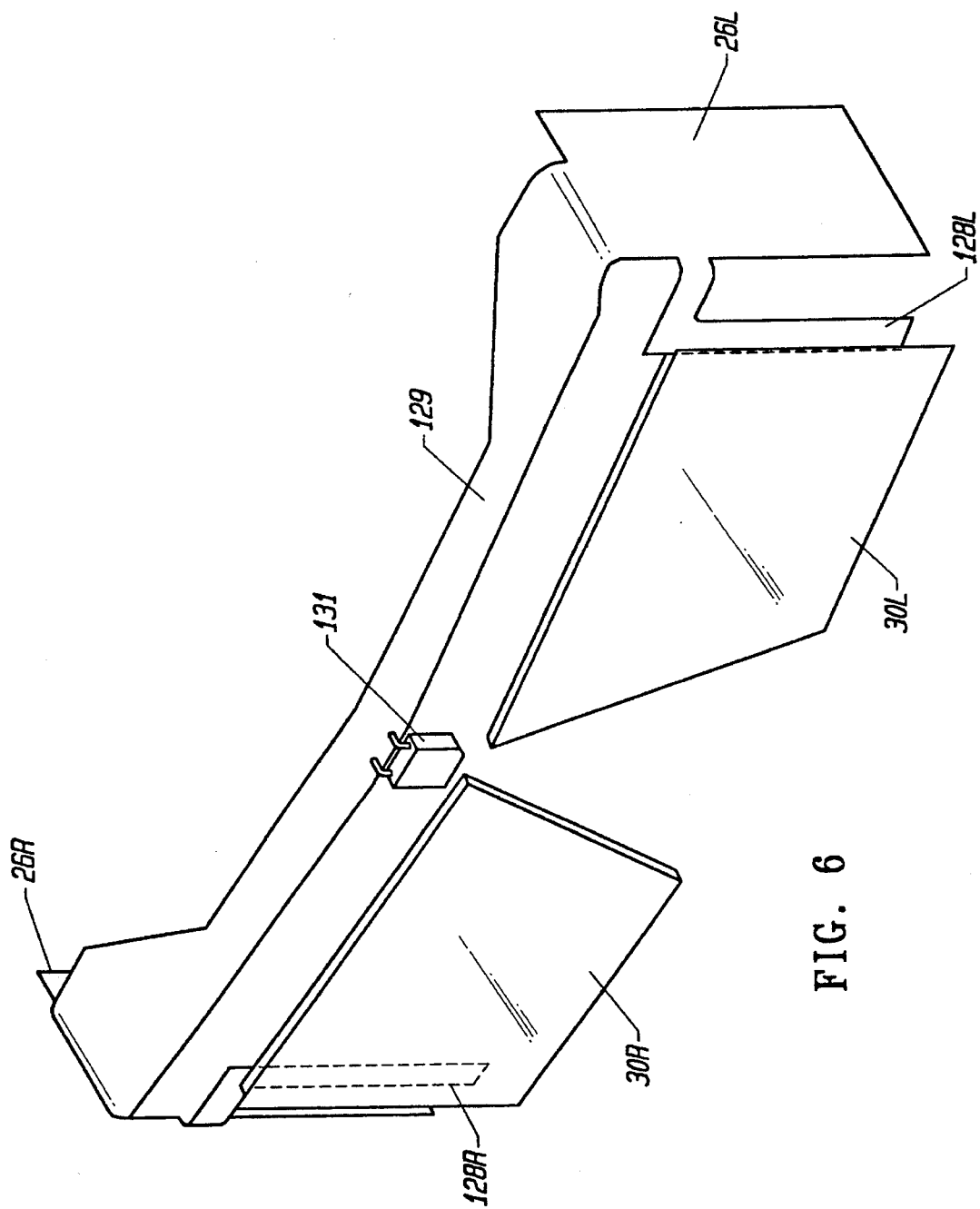
FIG. 6 is a perspective view illustrating the circuit board and LC lenses.

It should be recognized that many different constructions are possible in order to realize the eyewear of the present invention. As long as the basic functional aspects described above are included, the remaining task is simply to construct a lightweight, comfortable and aesthetically pleasing pair of eyewear. A particularly preferred embodiment that meets this objective is illustrated in FIGS. 4–6. It is not necessary for the understanding and implementation of eyewear according to the invention to provide detailed measurements of each component. However, the views presented in FIGS. 4–6 provide a basic template for the preferred embodiment, and the approximate dimensions thereof are provided.

The front frame 10 includes small openings 25 on the inside surface thereof into which corresponding bosses (not shown) on the rear frame 18 snap to lock the components securely together. The rear frame 14 also has hinge openings 13a on the top and bottom of each temple for receiving the hinge pins 13b on temple arms 12.

The circuit board is preferably shaped as shown in FIG. 6. The temple pads 26 are similar to those described earlier, but the LC pads 128R and 128L are slightly modified, as is the bridge strip 129. This figure also shows the infrared sensor 131 mounted on the bridge strip 129.

A person skilled in the art will readily understand that there are many possible variations on the embodiments described herein, and the inventors does not wish to limit themselves to these specific implementations where there are obvious variations that fall within the scope of this disclosure.

We claim:

1. In wireless active eyewear of the type used for viewing field sequential stereoscopic images which are generated along with synchronization information by a video source, said eyewear having a frame including a pair of lens openings and a pair of temple arms, a pair of electro-optical shutters mounted in correspondence with respective lens openings, an electrical circuit in contact with the shutters for driving the shutters out of phase with each other in accordance with the synchronization information, and a battery to power the electrical circuit, the improvement comprising the electro-optical shutters being integrally mounted in a soft and flexible molded gasket, said gasket being substantially non-conductive except for a plurality of conductive regions, said conductive regions being in electrical contact with said electro-optical shutters, wherein said gasket provides a protective shock mounting for the electro-optical shutters.

2. The eyewear of claim 1, the gasket further comprising an integrally molded nosepiece.

3. The eyewear of claim 1, wherein the conductive regions comprise a first plurality of conductive plugs grouped immediately adjacent to one of the lens openings and in contact with one of the electro-optical shutters and a second plurality of conductive plugs grouped immediately adjacent to the other of the lens openings and in contact with the other of the electro-optical shutters.

4. Wireless active eyewear utilizable for viewing field-sequential stereoscopic images, comprising:

a frame comprising a front portion having an inside surface and a pair of lens openings therein and a rear portion attached to the inside surface of the front portion and having a pair of lens openings therein;

a circuit board attached between the front portion and the rear portion;

a gasket attached between the front portion and the circuit board, said gasket being substantially non-conductive and having a pair of electro-optical shutters integrally mounted therein in correspondence with the lens openings and a plurality of conductive regions which are in electrical contact with the shutters and with the circuit board;

a pair of temple arms each pivotally attached to the frame and foldable toward the inside surface of the front portion, one of said temple arms having an actuation lever; and a switch positioned in close proximity to the actuation lever, wherein opening the temple arms causes the actuation lever to engage the switch and closing the temple arms causes the actuation lever to disengage the switch.

5. The eyewear of claim 4, wherein the conductive regions comprise a first plurality of conductive plugs grouped immediately adjacent to one of the lens openings and in contact with one of the electro-optical shutters and a second plurality of conductive plugs grouped immediately adjacent to the other of the lens openings and in contact with the other of the electro-optical shutters.

6. Wireless active eyewear as in claim 4, wherein the rear portion includes a face panel and a pair of temple panels, wherein the circuit board includes a pair of temple pads which conform to respective temple panels of the rear portion, a connecting strip which conforms to a first portion of the face panel outside of the lens openings and electrically connects the temple pads, and a pair of lens pads which conform to second portions of the face panel immediately adjacent to respective lens openings, wherein the gasket conforms to the face panel and abuts the connecting strip and lens pads of the circuit board such that the plurality of conductive regions are in electrical contact with the lens pads.

7. Active eyewear for stereoscopic applications, comprising:

a frame including a pair of lens openings and a pair of temple arms pivotally connected thereto, wherein a first of said temple arms has a post extending therefrom adjacent to its pivotal connection and the frame has a post opening located in correspondence with the post, a pair of electro-optical shutters mounted in respective lens openings, a circuit electronically coupled to the electro-optical shutters and to a controller, including means for receiving synchronization information from the controller and for driving the shutters out of phase with each other in accordance with the synchronization information, means to power the circuit, a switch wired in series with the power means and affixed to the frame proximate to the first temple arm, an actuator mounted on the frame adjacent to the switch and comprising a ramp portion, a plunger portion and a spring portion, wherein the plunger portion has a first end movably coupled to the frame and a second end movably engaged in the post opening, wherein the ramp portion is connected to the first end of the plunger portion and extends therefrom to contact and activate the switch when the plunger portion is depressed, and wherein the spring portion is connected transversely to the plunger portion and biases the plunger portion toward a deactivated position.

8. Eyewear as in claim 7, wherein the actuator comprises an integrally molded part.

9. Eyewear as in claim 8, wherein the frame includes a surface proximate to the pivotal connection having a plurality of pins extending therefrom for positioning the switch and the actuator on the surface.

10. Eyewear as in claim 9, wherein the switch is mounted over at least one of said pins, and wherein the plunger portion includes an elongated opening on its first end which is mounted over one of said pins, and wherein each end of the spring portion is held in place by two of said pins.

11. Eyewear as in claim 8, wherein the switch includes contacts having surfaces made from gold.

12. Wireless active eyewear utilizable for viewing field-sequential stereoscopic images, comprising:

a frame having a pair of lens openings and a post opening, a pair of temple arms pivotally attached to the frame, a gasket incorporated within the frame, said gasket being substantially non-conductive and having a pair of electro-optical shutters integrally mounted therein in correspondence with the lens openings and a plurality of conductive regions which are in electrical contact with the shutters and with the circuit board, a circuit incorporated within the frame and electronically coupled to the electro-optical shutters and to a controller, including means for receiving synchronization information from the controller and for driving the shutters out of phase with each other in accordance with the synchronization information, and means to power the circuit.

13. Eyewear as in claim 12, further comprising:

a switch wired in series with the power means and affixed to the frame proximate to one of said temple arms, and an actuator mounted on the frame adjacent to the switch and comprising a ramp portion, a plunger portion and a spring portion, wherein the plunger portion has a first end movably coupled to the frame and a second end movably engaged in the post opening, wherein the ramp portion is connected to the first end of the plunger portion and extends therefrom to contact and activate the switch when the plunger portion is depressed through the post opening by said one of said temple arms, and wherein the spring portion is connected transversely to the plunger portion and biases the plunger portion toward a deactivated position.

* * * * *